Jan. 1, 1924
1,479,652
C. CRANSTONE
FISH LURE
Filed May 2, 1922
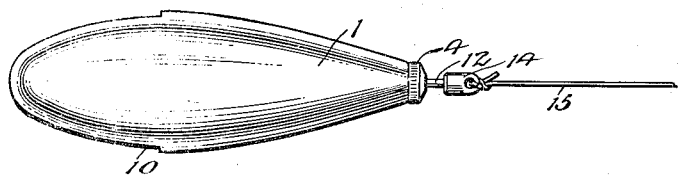
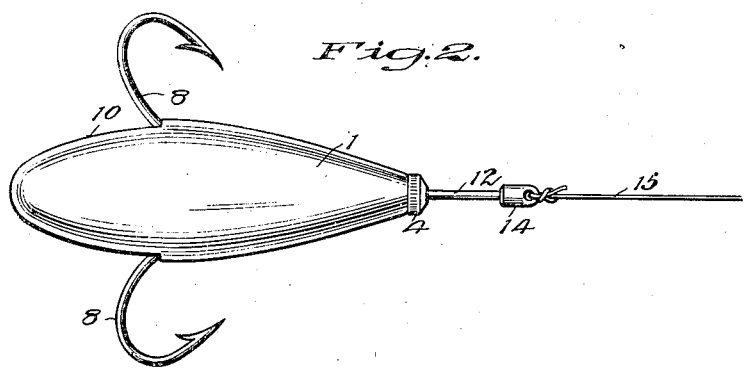
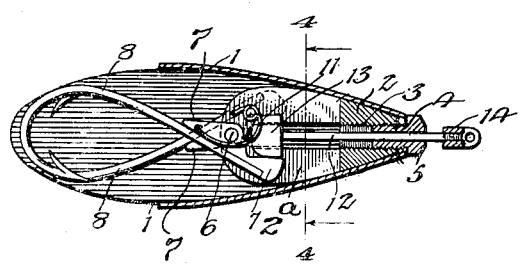
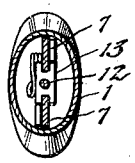
WITNESSES
INVENTOR
Charles Cranstone
BY
ATTORNEYS Patented Jan. 1, 1924.

1,479,652

UNITED STATES PATENT OFFICE.

CHARLES CRANSTONE, OF NEWPORT NEWS, VIRGINIA.

FISH LURE.

Application filed May 2, 1922. Serial No. 557,824.

*To all whom it may concern:*

Be it known that I, CHARLES CRANSTONE, a citizen of the United States, and a resident of Newport News, in the county of Warwick and State of Virginia, have invented a new and Improved Fish Lure, of which the following is a full, clear, and exact description.

This invention relates to improvements in fish lures, an object of the invention being to provide a fish lure which will present a smooth outer surface to prevent entanglement with weeds and grass and in which hooks are normally concealed, but which spring outward to snag the fish when a pull is had on the line.

A further object is to provide a lure of the character stated which can be manufactured and sold at a reasonably low price, which can be readily taken apart, cleaned and reassembled, and which will most efficiently perform the functions for which it is intended.

With these and other objects in view, the invention consists in certain novel features of construction and combinations and arrangements of parts as will be more fully hereinafter described and pointed out in the claims.

In the accompanying drawings—

Figure 1 is a view in side elevation of the lure.

Figure 2 is a similar view showing the hooks projected.

Figure 3 is a view in longitudinal section through the lure.

Figure 4 is a view in transverse section on the line 4—4, of Figure 3.

Referring to the drawings, 1 represents the body of my improved lure. This body is preferably of metal although it may be made of many other materials, is hollow and of general elliptical shape, and it is to be understood that the body may be ornamented and given a shape or configuration to suit the trade, although my invention is not limited in these particulars.

In the forward end of the body 1 a frame 2 is located, this frame 2 fits within the forward end of the body and is made at its forward end with a screw threaded bore 3, into which a threaded sleeve 4, which is projected through the open forward end of the body 1, is screwed and this sleeve 4 has an enlarged preferably milled outer end 5, to fit against the end of body 1.

The inner portion of the frame 2 constitutes a longitudinally slotted blade 2ª, having a pivot pin 6 projected therethrough and on this pivot pin 6 a pair of angle arms 7 are mounted. The angle arms 7 are at opposite sides of the blade 5 and to each angle arm a hook 8 is secured. These hooks are properly shaped to snag the fish and are normally within the confines of the body 1, but the latter at its rear end is made with an opening, or slot, 10 through which the hooks can be projected into the position shown in Figure 2.

Small springs 11 at opposite sides of the blade 2ª, each having one end secured to the blade and the other end to an angle arm 7, tend to swing the said arms on the pivot 6 and thereby force the hooks 8 outwardly.

A longitudinally movable rod 12, is mounted in the sleeve 4 and is provided at its inner end with a block 13. This block 13 is normally positioned between the two angle arms 7 serving to hold the inner ends of said arms apart and maintain the hooks 8 within the body 1. On the outer end of the rod 12 an eye nut 14 is screwed, or otherwise secured, and to this eye nut 14, the fish line 15 is secured.

In operation the lure is drawn through the water by the ordinary trolling operation with the hooks 8 maintained within the confines of the body 1. When the fish attacks the lure, the fisherman exerts a sharp pull on the line 15 and rod 12, causing the block 13 to move forwardly to release the arms 7 and allow the hooks 8 to spring outwardly and snag the fish. It will thus be noted that when the device is in set position there is little, if any, obstruction offered to catch grass, weeds, etc., and furthermore, it will be noted that by simply removing the sleeve 4 and the eye screw 14, the several parts of the lure can be easily taken apart, cleaned and reassembled.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A device of the character described, comprising a hollow body having an opening therein, pivotally mounted hooks normally within the body and movable through said opening to project the hooks, elastic means exerting pressure on the hooks to swing them outward through the opening, a device operated by the fish line and holding the hooks against the action of the elastic means within the body.

2. A device of the character described, comprising a hollow body having an opening therein, pivotally mounted and spring pressed hooks in the body and adapted to project thru the opening of the body, arms on the pivot of the hooks, and a slidable rod adapted to be connected to the fish line and provided on its inner end with a member normally positioned between the said arms to hold the hooks in the body.

3. A device of the character described, comprising a hollow body having an opening therein pivotally mounted hooks normally within the body and movable through said opening to project the hooks, a frame in the forward end of the lure, a sleeve screwed into the frame and having an enlarged outer end engaging the forward end of the body whereby the frame is coupled to the body, springs exerting outward pressure on the hooks, a block engaging the hooks and holding them against outward movement, and a rod adapted to be connected to the fish line said rod being also secured to the block and movable in the sleeve.

4. A device of the character described, comprising a hollow body having an opening therein, pivotally mounted hooks normally within the body and movable through said opening to project the hooks, a frame fitting within the forward end of body and having a screw threaded bore, a sleeve projected through the forward end of the body and screwed into the bore of the frame the said sleeve having an enlarged outer end engaging the outer end of the body, a blade on the body, angle arms pivotally connected to opposite sides of the blade and secured to the hooks, a block normally positioned between said angle arms and holding the hooks within the confines of the body, a rod fixed to the block and projecting forwardly from the sleeve, and an eye nut screwed on the outer end of the rod and adapted to connect with the fish line.

CHARLES CRANSTONE.